United States Patent
Neinast

[11] Patent Number: 5,974,644
[45] Date of Patent: Nov. 2, 1999

[54] BICYCLE PEDAL CRANK DISMOUNTING TOOL

[76] Inventor: Timothy Ray Neinast, 12306 Old Pomerado Rd. #30, Poway, Calif. 92064

[21] Appl. No.: 09/019,305

[22] Filed: Feb. 5, 1998

[51] Int. Cl.[6] .................................................. B23P 19/04
[52] U.S. Cl. ................................. 29/267; 29/280; 29/282; 29/269
[58] Field of Search .......................... 29/267, 264, 251, 29/280, 282

[56] References Cited

U.S. PATENT DOCUMENTS

| D. 325,153 | 4/1992 | Ju . | |
|---|---|---|---|
| 1,434,856 | 11/1922 | Stenson | 29/267 |
| 4,011,649 | 3/1977 | Hawkins | 29/267 |
| 4,286,368 | 9/1981 | Magana | 29/267 |
| 4,960,017 | 10/1990 | Hsiao . | |
| 5,099,726 | 3/1992 | Hsiao . | |
| 5,170,548 | 12/1992 | Ramirez . | |
| 5,233,741 | 8/1993 | Maynard . | |
| 5,320,005 | 6/1994 | Hsiao . | |
| 5,363,721 | 11/1994 | Hsiao . | |
| 5,369,863 | 12/1994 | Hasenberg et al. . | |
| 5,425,289 | 6/1995 | Iwinski . | |
| 5,440,950 | 8/1995 | Tranvoiz . | |
| 5,718,028 | 2/1998 | Hasenberg | 29/264 |

*Primary Examiner*—Robert C. Watson
*Attorney, Agent, or Firm*—Calif Tervo

[57] ABSTRACT

A tool for dismounting a bicycle pedal crankarm from a crankshaft. A bicycle crankshaft has a mounting end and the crankarm has a crank mount having a bore therethrough having on one end a socket mounted on the crankshaft mounting end. The tool includes a puller and a handle. The puller comprises a housing having a column bore therein and having a proximal end and a distal end having screw threads adapted for mating attachment with internal screw threads in the crank mount bore. A column comprised of a piston and a rolling bearing is contained in the column bore and reciprocally slidable therein. The handle is pivotally connected to the puller and pivotable 180° between an attachment position and a dismount position. Pivotal movement of the handle between an attachment position and a dismount position when the housing is attached to the crankarm mount moves a cam that moves the column against the crankshaft mounting end to dismount the crankarm. Preferably, the handle pivot axis is off the contact axis defined as the direction of column movement through point of contact between the cam and the column.

16 Claims, 2 Drawing Sheets

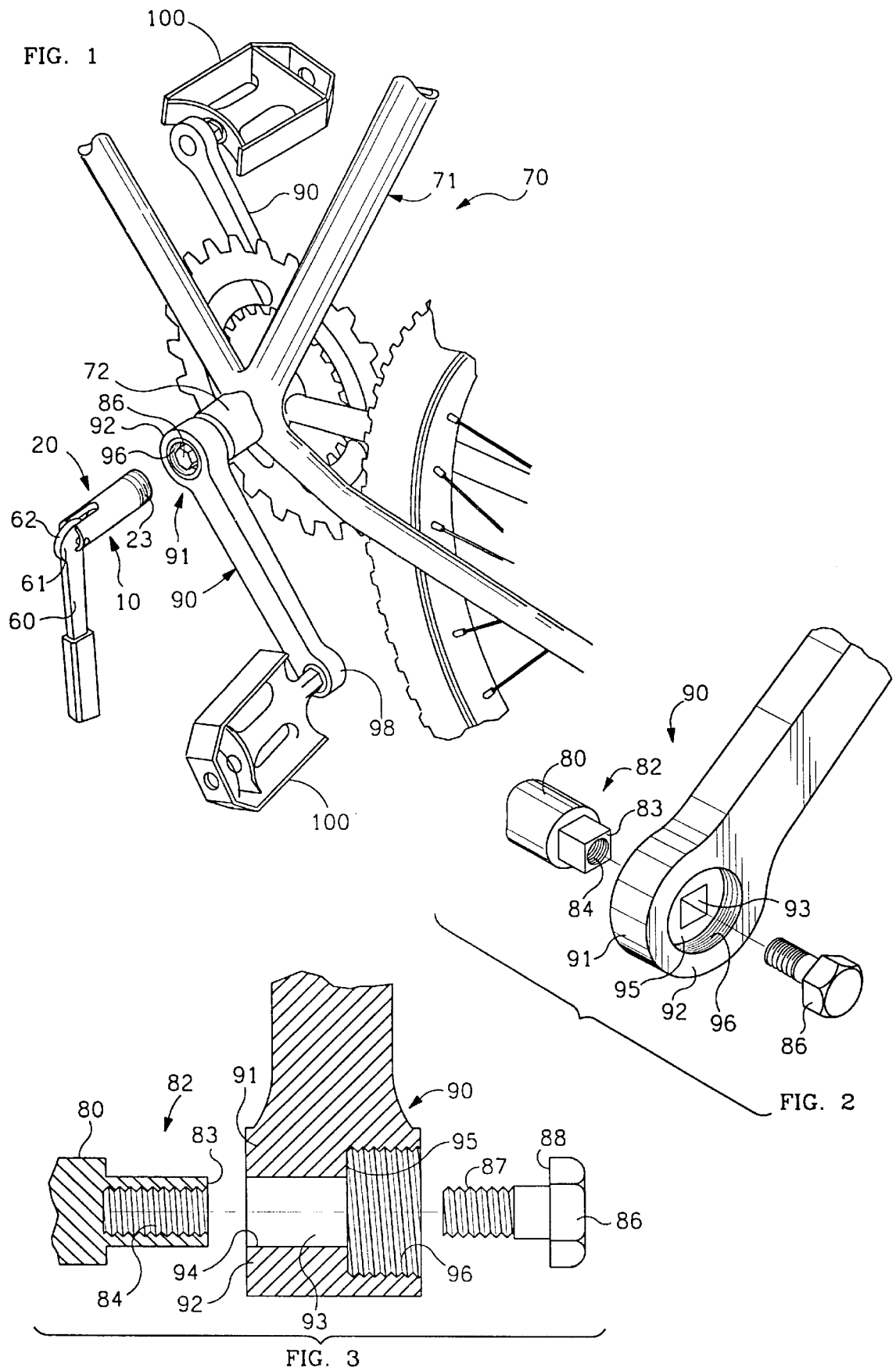

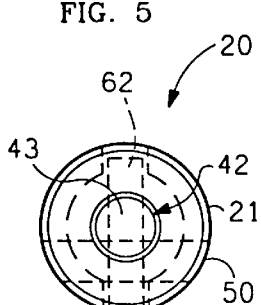
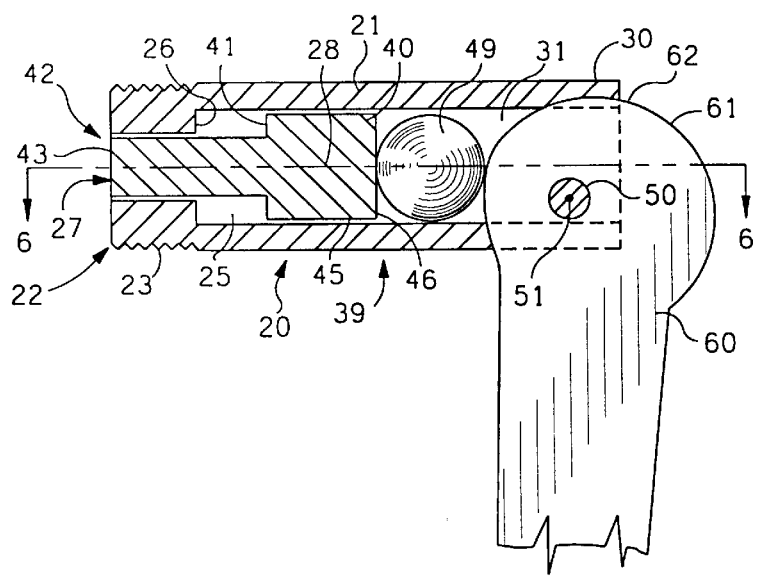
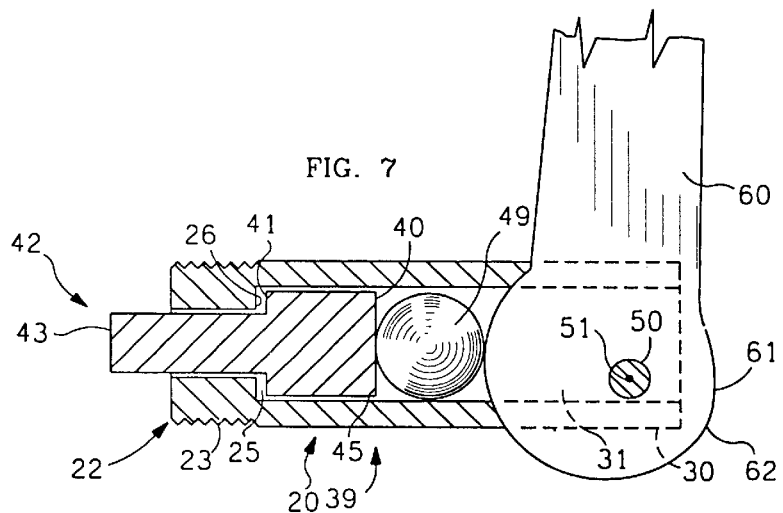

000001
BICYCLE PEDAL CRANK DISMOUNTING TOOL

BACKGROUND OF THE INVENTION

1. Field of the Invention

This invention relates in general to a tool for dismounting a bicycle pedal crank arm from the crankshaft and more specifically involves a puller activated by a cam.

2. Description of the Prior Art

Conventional dismount devices are slow in operation as they require a plurality of wrenches, spanners in their use, multiple manipulation of their elements, many turns of a threaded shaft or require substantial strength.

Therefore, particularly in a bike repair shop, there has been a need for a dismount tool that is fast in operation, easy to use and requires little strength.

SUMMARY OF THE INVENTION

This invention is a tool for dismounting a bicycle pedal crankarm from a crankshaft. A bicycle crankshaft has a mounting end and the crankarm has a crank mount having a bore therethrough having on one end a socket mounted on the crankshaft mounting end. An exemplary embodiment of the tool includes a puller and a handle. The puller comprises a housing having a column bore therein and having a proximal end and having a distal end having screw threads adapted for mating attachment with internal screw threads in the crank mount bore. A column comprised of a piston and a rolling bearing is contained in the column bore and reciprocally slidable therein.

The handle is pivotally connected to the puller and pivotable 180° between an attachment position and a dismount position. The handle has distal end having a cam bearing against the column proximal end such that, in response to pivotal movement of the handle between the attachment position and the dismount position when the housing is attached to the crankarm mount, the cam moves the column in the column bore such that the column distal end pushes against the crankshaft mounting end and the housing pulls the crank mount away from the crankshaft mounting end thereby dismounting the crankarm. Preferably, the handle pivot axis is off the contact axis defined as the direction of column movement through point of contact between the cam and the column.

Other features and many attendant advantages of the invention will become more apparent upon a reading of the following detailed description together with the drawings in which like reference numerals refer to like parts throughout.

BRIEF DESCRIPTION OF THE DRAWING

FIG. 1 is a partial perspective view of a bicycle and a perspective view of the tool of the invention in position for attachment.

FIG. 2 is an enlarged partial exploded perspective view of the pedal crankarm mount of FIG. 1.

FIG. 3 is an enlarged partial, cross-sectional view of the pedal crankarm mount of FIG. 2.

FIG. 4 is a partial left side elevation view of a preferred embodiment of the bicycle crank dismounting tool of the invention with the handle in the attachment position; the right side being a mirror image.

FIG. 5 is a front elevation view of the tool of FIG. 4.

FIG. 6 is a top plan view of the tool of FIG. 4.

FIG. 7 is a partial left side elevation view of the tool of FIG. 4 with the handle in the dismount position; the right side being a mirror image.

DETAILED DESCRIPTION OF THE PREFERRED EMBODIMENT

Reference is now made to FIGS. 1–3 of the drawings which show the environment of dismount tool 10 of the invention. FIG. 1 is a partial perspective view of a bicycle 70 and a perspective view of the tool 10 of the invention in position for attachment to bicycle 70. FIG. 2 is an enlarged partial exploded perspective view of the pedal crankarm mount of FIG. 1. FIG. 3 is an enlarged partial, cross-sectional view of the pedal crankarm mount of FIG. 2. As best seen in FIG. 1, Bicycle 70 has a frame 71 with a bottom bracket 72. Mounted in bottom bracket 72 is a crankshaft 80 having protruding mounting ends 82 to which pedal crankarms 90 are attached. Crankarms 90 have an inner end 91 comprising a crank mount 92 and an outer end 98 to which a pedal 100 is attached.

As best seen in FIGS. 2 and 3, each mounting end 82 of crankshaft 80 is substantially square in transverse cross section, has an end face 83 and includes means, such as internally threaded axial bore 84 for receiving crank lock screw 86 for attachment of crankarm 90. Although, bore 84 and lock screw 86, shown, is the most common means for attachment of crankarm 90 to crankshaft 80, other attachment means are contemplated and tool 10 of the invention will function as is or with such slight modifications as are obvious to some one reasonably skilled in the art. For example, the attachment means may comprise a threaded stud axially outwardly extending from crank end face and a crank locking nut instead of lock screw 86.

Means is provided for mounting crankarm 90 to crankshaft 80 and for torque transference thereto. Crank mount 92 has a bore 93 extending therethrough. On the inner end of bore 93 is a socket 94 shaped and dimensioned for mating engagement with mounting end 82 of crankshaft 80. In the illustration shown, socket 94 and crankshaft mounting end 82 are square in lateral cross section. However, crankshaft mounting end 82 and socket 94 may be of other shapes, such as hexagonal or splined, in lateral cross section. These are common configurations whereby the shape of the elements is the torque transferring mechanism. However, it is also contemplated that the shapes not be torque-transferring in which other means, such as set screws or the like, are used to facilitate torque transference.

Crank lock screw 86 includes an inner threaded portion 87 for threaded engagement with crankshaft threaded bore 84 and a head 88 for bearing on crankarm 90, such as on shoulder 95 within bore 93, for securing crankarm 90 to crankshaft 80.

To dismount crankarm 90 from crankshaft 80 for servicing, repair or replacement is typically quite difficult. The fit between crankshaft mounting end 82 and socket 94 is typically very tight and the substantial torque applied to the crankarms 90 in use wedges them very tightly on crankshaft ends 92. To dismount, first, lock screw 86 is removed. To facilitate dismount, attachment means, such as internally threaded counter bore 96, is provided on the outer end of crank mount bore 93 for attachment of dismount tool 10. Other crank mount attachment means, such as receptacles for a bayonet mount are contemplated.

Turning also to FIGS. 4–6, there is shown a preferred embodiment of the bicycle crank dismounting tool 10 of the invention. FIG. 4 is a partial left side elevation view of tool 10 in the attachment position; the right side being a mirror image. FIG. 5 is a front elevation view of the tool 10 of FIG. 4. FIG. 6 is a top plan view of the tool 10 of FIG. 4. FIG. 7 is a partial left side elevation view of the tool 10 of FIG. 4 in the dismount position; the right side being a mirror image.

Dismount tool 10 generally comprises puller 20, handle 60 and means, such as pivot pin 50, for pivotally connecting handle 60 to proximal end 30 of puller 20.

Puller 20 includes a housing 21 having means for firmly attaching housing 21 to crank mount 92. In the preferred embodiment shown, the housing attachment means includes external threads 23 on housing distal end 22 adapted for threaded engagement with internal threads of counter bore 96 in crank mount 92. Other housing attachment means, such as a bayonet mount, could be substituted.

A column bore 25 in housing 21 has an orifice 27 in distal end 22. Column bore 25 contains a dismount column 39 which is reciprocally slidable therein. Dismount column 39 has a distal end for bearing against crankshaft end face 83 and a proximal end for bearing against handle 60. In the preferred embodiment, column comprises a piston 40 and a rolling bearing, such as ball bearing 49. Preferably, when puller 20 is attached to crank mount 92, column bore 25 guides piston 40 along an axis 28 coaxial to the axis of crankshaft 80. Means, such as shoulder 41 on piston 40 and shoulder 26 in bore 25, is provided for preventing piston 40 from sliding completely from bore 25 through orifice 27. Piston 40 has a distal end 42 having an end face 43 and a proximal end 45 having an end face 46. Also, contained in column bore 25 is a rolling bearing, such as ball bearing 49. Bearing 49 has a proximal side facing handle 60 and bearing against cam 62 of handle 60 and a distal side facing and bearing against piston 40. Friction and wear are reduced by inclusion of bearing 49 in tool 10. However, tool 10 will function without bearing 49 in which case piston proximal end face 46 bears directly on handle 60.

Housing proximal end 30 includes a generally slotted opening 31 in communication with column bore 25. Pivot pin 50 is mounted to housing 30 across opening 31.

The distal end 61 of handle 60 is disposed in slotted opening 31 and is pivotally connected to puller 20, such as by pivot pin 50, such that handle 60 can pivot through 180° from a first or attachment position, shown, to a second or dismount position. Handle distal end 61 includes a surface located radially outward from the axis 51 of pivot pin 50. This surface acts as a cam 62 proceeding outward in a smooth curve from a short radius "A" to a long radius "B". As shown in FIG. 4, with handle 60 in the attachment position, cam 62 has a short radius "A" toward column 39 such that piston distal end face 43 can retract at or near housing distal end 22 such that puller threads 23 can be easily screwed into threads of crank mount counter bore 96.

As shown in FIG. 7, swinging handle 50 180° to the dismount position, bears long radius "B" of cam 62 against bearing 49 thereby moving column 39 of bearing 49 and piston 40 such that piston distal end face 43, bearing against crankshaft end face 83, is further protruded to dismount crankarm 90. In the embodiment shown, short radius "A" is approx 1.3 cm. and long radius "B" is 2.0 cm. such that column 39 moves 0.7 cm. which is sufficient movement to free crankarm 90 from crankshaft 80.

Cam 62 contacts column 39 at a contact point. This point and the direction of movement of column 39 defines a contact axis 55. In the embodiment shown, the contact axis and the column axis are the same, but they need not be so. Preferably, pivot axis 51 does not pass through the contact axis but is well off to one side. If pivot axis 51 is on the contact axis, then the cam 62 exerts a considerable tangential force, i.e. a force perpendicular to contact axis 55, on the contact point which tends to force column 39 into the side wall of column bore 25 and increases the force required for the movement, With placement of pivot axis 55 on the opposite side of contact axis from the incoming increasing radius, when moving handle 60 from the attachment to the dismount position, the increasing radius of cam 62 exerts a force on column 39 more in line with contact axis 55 so less force is required.

Having described the invention, it can be seen that it provides a very convenient device for dismounting a bicycle pedal crankarm from the crankshaft.

Although a particular embodiment of the invention has been illustrated and described, various changes may be made in the form, composition, construction, and arrangement of the parts without is sacrificing any of its advantages. For example, if the outer end 83 of crankshaft 80 is a stud, then piston distal end 42 can be adapted to push against its end face or adapted with a bore to receive the stud and still push against the remainder of the end face. Therefore, it is to be understood that all matter herein is to be interpreted as illustrative and not in any limiting sense, and it is intended to cover in the appended claims such modifications as come within the true spirit and scope of the invention.

I claim:

1. A tool for dismounting a bicycle pedal crankarm from a crankshaft; the crankshaft having a mounting end; the crankarm having a crank mount having a bore having a socket mounted on the crankshaft mounting end; said tool comprising:

a puller comprising:
a housing having a distal end and a proximal end; said housing including:
attaching means for attaching said housing to the crank mount; and
a column bore in said housing;
a column contained in said column bore and reciprocally slidable therein; said column having:
a proximal end; and
a distal end;

a handle pivotally connected to said puller and pivotable between an attachment position and a dismount position, said handle comprising:
a proximal end; and
a distal end having:
a cam; said cam bearing against said column proximal end such that, in response to pivotal movement of said handle between the attachment position and the dismount position when said housing is attached to the crankarm mount, said cam moves said column in said column bore such that said column distal end pushes against the crankshaft mounting end and said housing pulls the crank mount away from the crankshaft mounting end; and pivot means having a pivot axis; said pivot means for pivotally connecting said handle to said puller;

wherein said column comprises:
a piston having:
a proximal end; and
a distal end; said piston distal end being said column distal end; and
a rolling bearing; said bearing having a proximal side bearing against said cam and being said column proximal end.

2. The tool of claim 1 wherein said handle pivots substantially 180° between the attachment position and the dismount position.

3. The tool of claim 1 wherein:
said housing attaching means for attaching said housing to the crank mount is adapted for attachment with mating attachment means on the crankarm mount.

4. The tool of claim 3 wherein:
said housing attaching means comprises screw threads on said housing distal end and the mating attachment means on the crankarm crank mount comprises mating screw threads in the crank mount bore.

5. The tool of claim 1 wherein:
the point of contact between said cam and said column and the direction of column movement define a contact axis and said pivot axis is off said contact axis.

6. The tool of claim 5 wherein said handle pivots substantially 180° between the attachment position and the dismount position.

7. A tool for dismounting a bicycle pedal crankarm from a crankshaft; the crankshaft having a mounting end; the crankarm having a crank mount having a bore therethrough having on one end a socket mounted on the crankshaft mounting end and having on the other end internal threads; said tool comprising:
a puller comprising:
a housing having a distal end and a proximal end; said housing including:
screw threads on said housing distal end adapted for mating attachment with the internal screw threads in the crank mount bore; and
a column bore in said housing;
a column contained in said column bore and reciprocally slidable therein; said column having:
a proximal end; and
a distal end;
a handle pivotally connected to said puller and pivotable between an attachment position and a dismount position, said handle comprising:
a proximal end; and
a distal end having:
a cam; said cam bearing against said column proximal end such that, in response to pivotal movement of said handle between the attachment position and the dismount position when said housing is attached to the crankarm mount, said cam moves said column in said column bore such that said column distal end pushes against the crankshaft mounting end and said housing pulls the crank mount away from the crankshaft mounting end; and
pivot means for pivotally connecting said handle to said puller;
wherein said column comprises:
a piston having:
a proximal end; and
a distal end; said piston distal end being said column distal end; and
a rolling bearing; said bearing having a proximal side bearing against said cam and being said column proximal end.

8. The tool of claim 7 wherein said handle pivots substantially 180° between the attachment position and the dismount position.

9. The tool of claim 7 wherein:
the point of contact between said cam and said column and the direction of column movement define a contact axis and said pivot axis is off said contact axis.

10. The tool of claim 9 wherein said handle pivots substantially 180° between the attachment position and the dismount position.

11. In combination: a bicycle pedal crankarm and a tool for dismounting said crankarm from the mounting end of a crankshaft; said crankarm comprising:
a crank mount having attaching means for attaching said tool and a bore therethrough having an outer end and having an inner end having end a socket mounted on the crankshaft mounting end; and said tool comprising:
a puller comprising:
a housing having a distal end and a proximal end; said housing including:
attaching means on its said distal end adapted for mating attachment with said attaching means of said crank mount; and
a column bore in said housing;
a column contained in said column bore and reciprocally slidable therein; said column having:
a proximal end; and
a distal end;
a handle pivotally connected to said puller and pivotable between an attachment position and a dismount position, said handle comprising:
a proximal end; and
a distal end having:
a cam; said cam bearing against said column proximal end such that, in response to pivotal movement of said handle between the attachment position and the dismount position when said housing is attached to the crankarm mount, said cam moves said column in said column bore such that said column distal end pushes against the crankshaft mounting end and said housing pulls the crank mount away from the crankshaft mounting end; and
pivot means for pivotally connecting said handle to said puller.

12. The combination of claim 11 wherein said handle pivots substantially 180° between the attachment position and the dismount position.

13. The combination of claim 11 wherein:
said column comprises:
a piston having:
a proximal end; and
a distal end; said piston distal end being said column distal end; and
a rolling bearing; said bearing having a proximal side bearing against said cam and being said column proximal end.

14. The combination of claim 11 wherein:
said crank mount attaching means comprises internal screw threads in said outer end of said crank mount bore; and
said housing attaching means includes screw threads on said housing distal end adapted for mating attachment with said internal screw threads in said crank mount bore.

15. The tool of claim 11 wherein:
the point of contact between said cam and said column and the direction of column movement define a contact axis and said pivot axis is off said contact axis.

16. The tool of claim 11 wherein said handle pivots substantially 180° between the attachment position and the dismount position.

* * * * *